United States Patent [19]

Inoue et al.

[11] Patent Number: 4,764,577
[45] Date of Patent: Aug. 16, 1988

[54] CURABLE POLYMERIC COMPOSITION

[75] Inventors: Yoshio Inoue; Masatoshi Arai, both of Gunma, Japan

[73] Assignee: Shin-Etsu Chemical Co., Ltd., Tokyo, Japan

[21] Appl. No.: 79,063

[22] Filed: Jul. 29, 1987

[30] Foreign Application Priority Data

Jul. 30, 1986 [JP] Japan .................................. 61-179573

[51] Int. Cl.$^4$ ............................................. C08G 65/32
[52] U.S. Cl. .................................... 525/409; 525/105; 525/106; 525/423; 528/15; 528/31; 528/32
[58] Field of Search ................ 525/409, 105, 106, 523; 528/15, 31, 32

[56] References Cited

U.S. PATENT DOCUMENTS 4,617,238 10/1986 Crivello et al. ........................ 528/15

Primary Examiner—Melvyn I. Marquis
Attorney, Agent, or Firm—Millen & White

[57] ABSTRACT

The curable polymeric composition comprises: (A) an organic polymer having at least two alkenyloxysilyl groups; (B) an organosilicon compound having at least two hydrosilyl groups; and (C) a catalytic amount of a platinum compound. When heated, the composition is curable by the hydrosilation reaction between the alkenyloxy groups in the compound (A) and the silicon-bonded hydrogen atoms in the compound (B) as promoted by the platinum compound to give a rubbery elastomer.

9 Claims, No Drawings

CURABLE POLYMERIC COMPOSITION

BACKGROUND OF THE INVENTION

The present invention relates to a curable polymeric composition or, more particularly, to a curable polymeric composition of a novel type useful as a potting agent, adhesive, coating material and the like formulated with an alkenyloxysilyl-containing organic polymer as the base ingredient as well as a cured rubbery elastomer obtained therefrom.

In the chemistry and industry of organosilicon compounds, alkenyloxysilyl-containing compounds such as the organosilane compounds represented by the general formula

in which $R^1$ is a monovalent hydrocarbon group, $R^2$ and $R^3$ are each hydrogen atom or a monovalent hydrocarbon group and n is a positive integer of 1, 2 or 3, including, typically, methyl triisopropenyloxy silane, are well known and useful as an important ingredient in many silicone compositions. For example, methyltriisopropenyloxy silane is useful as a crosslinking agent in a room temperature-curable organopolysiloxane composition utilizing the reactivity of the isopropenyloxy groups with water in the presence of a curing catalyst, such as amine compounds, carboxylates of heavy metals and the like, to produce acetone as a condensation by-product and forming a siloxane linkage (see, for example, Japanese Patent Publication No. 51-39673). Room temperature-curable organopolysiloxane compositions curable by this mechanism are very advantageous in respect of the high heat resistance and absence of corrosiveness so that they are widely used as a heat-resistant material for insulating sealing of various kinds of electronic components and as a sealing material in and around automobile engines.

It is also know that the alkenyloxy-containing organosilicon compounds or, in particular, isopropenyloxy-containing organosilicon compounds are susceptible to photochemically induced addition reaction with a mercapto group-containing organosilicon compound under irradiation with ultraviolet light in the presence of a photosensitizer. This principle is utilized in several photocurable organopolysiloxane compositions.

In addition to the above described mechanisms of reactions, it is known that alkenyloxy silyl groups can participate in the so-called hydosilation reaction with silicon-bonded hydrogen atoms or hydrosilyl groups in the presence of a platinum catalyst. This principle is utilized in the present invention for the curing reaction of an organic polymer.

SUMMARY OF THE INVENTION

The curable polymeric compositions of the present invention comprise:
(A) an organic polymer having at least two alkenyloxysilyl groups;
(B) up to 5 times by weight of component (A) of an organosilicon compound having at least two hydrosilyl groups; and
(C) a catalytic amount of a platinum compound.

The cured rubbery elastomers of this invention are produced by heating the curable polymeric compositions defined above.

DETAILED DESCRIPTION OF THE PREFERRED EMBODIMENTS

The essential components in the inventive composition are an alkenyloxysilyl-containing organic polymer as component (A), a hydrosilyl-containing organosilicon compound as component (B) and a platinum compound as component (C) to serve as a catalyst for the addition reaction between components (A) and (B). When properly formulated, the composition of the invention can readily be converted into a cured elastomeric material by the addition reaction between the components (A) and (B) which proceeds by heating.

The component (A) in the inventive composition is an alkenyloxysilyl-containing organic polymer having, in a molecule, at least two alkenyloxysilyl groups represented by the general formula

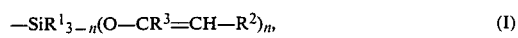

in which $R^1$ is a monovalent hydrocarbon group, $R^2$ and $R^3$ are each a hydrogen atom or a monovalent hydrocarbon group and n is a positive integer of 1, 2 or 3. The monovalent hydrocarbon group denoted by $R^1$, $R^2$ or $R^3$ is exemplified by alkyl groups, e.g., methyl and ethyl groups, and aryl groups, e.g., phenyl group, though not particularly limited thereto. The alkenyloxysilyl groups are contained in the organic polymer as the pendant groups on the polymeric main chain structure which is not particularly limitative including the polymeric main chains of polyethers, polyolefins, acrylic polymers, epoxy polymers, polysiloxanes and the like. Preferably, the polymeric main chain of the component (A) should be a poly(diorganosiloxane), e.g., poly(dimethylsiloxane), or a polyether, e.g., polyoxyethylene and polyoxypropylene, of which poly(diorganosiloxanes) having no hydrogen atoms directly bonded to the silicon atoms are the most preferred.

The alkenyloxysilyl-containing organic polymer suitable as the component (A) can be obtained in several known methods. For example, firstly, an addition reaction by the hydrosilation is undertaken in the presence of a platinum catalyst between an organic polymer having at least two ethylenically unsaturated groups having a linkage of —CH=CH—, e.g., vinyl and allyl groups, and an alkenyloxy hydrosilane of the general formula $HSiR^1{}_{3-n}(O-CR^3=CH-R^2)_n$, in which each symbol has the same meaning as defined above, exemplified by dimethyl isopropenyloxy silane, methyl diisopropenyloxy silane, tri(1-ethylvinyloxy) silane, dimethyl 1-ethylvinyloxy silane and the like. The addition reaction proceeds according to the following reaction equation when the ethylenically unsaturated group in the organic polymer is a vinyl group:

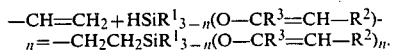

Secondly, a hydrosilation reaction may be undertaken in the presence of a platinum catalyst between an organic polymer having, in a molecule, at least two hydrosilyl groups of the formula —Si—H, such as a methyl hydrogen polysiloxane, which is composed of the recurring units of the formula —SiHCH$_3$—O—, and an alkenyloxy-containing alkenyl silane compound of the general formula $R'SiR^1_{3-n}(O-CR^3=CH-R^2)_n$, in which R' is an alkenyl group, e.g., vinyl and allyl groups, and each of the other symbols has the same meaning as defined above, exemplified by vinyl triisopropenyloxy silane, allyl tri(cyclohex-1,2-enyloxy) silane, vinyl methyl di(1-phenylvinyloxy) silane and the like. The hydrosilation reaction proceeds according to the following reaction equation, when the alkenyl group R' is a vinyl group:

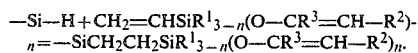

Thirdly, a condensation reaction to form a siloxane linkage may be undertaken at room temperature or under heating between an organic polymer having, in its molecule, at least two silanolic hydroxy groups, such as an α,ω-dihydroxy-dimethylpolysiloxane, and an alkenyloxy-containing silane compound, such as methyl triisopropenyloxy silane, vinyl triisopropenyloxy silane, phenyl tri(cyclohex-1,2-enyloxy) silane and methyl tri(1-phenylvinyloxy) silane, in the presence of a condensation catalyst, e.g., a heavy metal carboxylate, amine, salt of an amine with an organic acid and the like. The condensation reaction proceeds, for example, according to the reaction equation:

$$-SiOH + R^1Si(O-CR^3=CH-R^2)_3 = -Si-O-SiR^1(O-CR^3=CH-R^2)_2 + R^3-CO-CH_2-R^2.$$

Specific examples of the organic polymer as the component (A) having alkenyloxysilyl groups include the compound expressed by the following formulas, in which the symbols Me and Gl denote methyl and glycidyl groups, respectively:

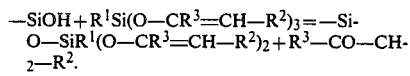

in which p is a positive integer of, e.g., 142 on an average;

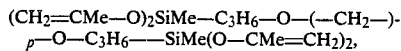

in which q is a positive integer of, e.g., 69 on an average; and

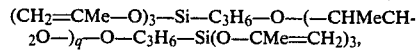

in which $-C_6H_3OGl-$ is a glycidyloxy-substituted phenylene group and r is a positive integer of, e.g., 5 on an average.

The component (B) in the inventive composition is an organosilicon compound having, in its molecule, at least two hydrosilyl groups —SiH and exemplified by: 1,1,3,3-tetramethyl disiloxane; trimethylsilyl-terminated methyl hydrogen polysiloxane of the formula

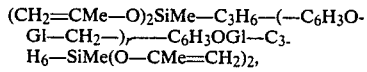

trimethylsilyl-terminated poly(methylhydrogen siloxane-dimethyl siloxane) of the formula

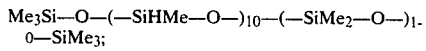

1,3,5,7-tetramethyl cyclotetrasiloxane; and 1,3,5,7-tetramethyl 1,3-dipropyl cyclotetrasiloxane. It is also possible that the organosilicon compound is an organosilicon-modified organic polymer having, in its molecule, at least two hydrosilyl groups obtained by the partial addition reaction between an organic polymer having ethylenically unsaturated linkages and an organopolysiloxane having silicon-bonded hydrogen atoms.

The amount of the above described component (B) in the inventive compositions can vary widely, e.g., in the range from 0.1 to 500 parts by weight or, preferably, from 1.0 to 100 parts by weight per 100 parts by weight of the component (A).

The component (C) is an organic or inorganic platinum compound which serves as a catalyst to promote the addition reaction between the alkenyloxy groups in the component (A) and the silicon-bonded hydrogen atoms or hydrosilyl groups in the component (A). Suitable platinum compounds include chloroplatinic acid, alcoholic solutions of chloroplatinic acid, complexes of chloroplatinic acid with an olefin or vinyl siloxane and the like. An amount effective to catalyze the hydrosilation reaction of the platinum compound as the component (C) should be present in the inventive composition, e.g., in the range from 0.1 to 1000 ppm by weight or, preferably, from 1 to 50 ppm by weight as platinum based on the amount of the component (A). When the amount of the platinum compound is too small, full curing of the composition can hardly be obtained. When the amount of the platinum compound is too large, on the other hand, the curing velocity of the composition may be so rapid as to cause some inconvenience in handling in addition to the disadvantages of decrease in the storability of the ready-mixed composition and poor mechanical properties of the cured composition as a rubbery elastomer if not to mention the increase in the cost due to the expensiveness of the platinum compound.

The curable polymeric composition of the invention can be prepared by uniformly blending calculated amounts of the above described components (A), (B) and (C) in a suitable blending machine. When extension of the pot life of a ready-mixed composition is desired, the composition may be admixed with an acetylenic compound. Mechanical properties of the composition after curing can be improved by compounding the composition with a substantial amount of an inorganic filler such as fumed silica, calcined silica, precipitated silica, fumed titanium dioxide, carbon black, calcium carbonate, diatomaceous earth and calcium silicate as well as hydrophobic fillers obtained by the treatment of these fillers with an organochlorosilane, organopolysiloxane, hexamethyl disilazane and the like. The amount of such fillers in the inventive composition, when formulated, should not exceed 300 parts by weight per 100 parts by weight of the component (A). When the amount of a filler in the inventive composition is too large, the composition may have an unduly increased consistency to cause decrease in the workability and the composition after curing may have an unduly high elastic modulus.

The curable polymeric composition of the invention can readily be cured into a cured rubbery elastomer when it is heated at a relatively low temperature of, for example, 80° to 175° C. or, preferably, about 120° to 150° C., e.g., for about 15 minutes to about 4 to 5 hours or, preferably, about 30 minutes to 1 to 2 hours. The composition has a relatively long pot life even after blending of all of the ingredients together. When the composition of the invention has been cured in contact with the surface of a substrate made of an inorganic material or metal, good adhesion is obtained between the cured rubbery elastomer of the inventive composition and the substrate surface. The curable polymeric composition of the invention is therefore advantageously used in many applications, for example, as a potting agent, adhesive, coating material and the like.

In the following, the curable polymeric composition of the invention is described in more detail by way of examples as preceded by the description for the synthetic preparation of the component (A). In the description below, the term of "parts" always refers to "parts by weight" and the values of viscosity are all those obtained by the measurement at 25° C.

Preparation 1.

Into a four-necked glass flask of 3 liters capacity equipped with a stirrer, thermometer and reflux condenser having a stop-cocked outlet at the bottom for discharge of the condensate were introduced 1000 g of an α,ω-divinyl dimethylpolysiloxane having a viscosity of 615 centistokes and 1000 g of toluene and the mixture was heated under reflux to effect dehydration by discharging distilled water from the bottom of the condenser. After cooling to room temperature, 0.4 g of an isopropyl alcohol solution of chloroplatinic acid in a concentration of 2% by weight as platinum and 23.7 g of methyl diisopropenyloxy silane were added to the mixture in the flask which was then heated at 70° to 80° C. for 3 hours under agitation. Thereafter, the mixture was stripped to remove toluene under reduced pressure to leave 990 g of a clear liquid product having a viscosity of 820 centistokes, specific gravity of 0.974 and refractive index of 1.4057, which is referred to as the polymer A hereinbelow. The results of infrared absorption spectrophotometric and NMR spectrometric analyses supported that the polymer A was an organopolysiloxane which could be expressed by the following formula, in which Me denotes a methyl group:

(CH$_2$=CMe—O)$_2$SiMe—CH$_2$C-
H$_2$—(—SiMe$_2$—O—)$_{180}$—
—SiMe$_2$—CH$_2$CH$_2$—SiMe(O—CMe=CH$_2$)$_2$.

Preparation 2.

The procedure was about the same as in Preparation 1 described above except that the α,ω-divinyl dimethylpolysiloxane was replaced with the same amount of a methyl phenyl vinyl polysiloxane having a viscosity of 720 centistokes and containing 0.27 mole per 100 g of vinyl groups, each terminal silicon atom having a vinyl group bonded thereto, of which the content of the phenyl groups was 2.0% by moles based on the overall organic groups, and 23.7 g of methyl diisopropenyloxy silane were replaced with 42.7 g of methyl methoxy isopropenyloxy silane to give 985 g of a clear liquid product having a viscosity of 960 centistokes, which is referred to as the polymer B hereinbelow. The reuslts of the analyses supported that the polymer B was an organopolysiloxane which could be expressed by the following formula:

Q—(—SiMe$_2$—O—)$_{140}$—(—SiMeQ—O—)—SiPh-
$_2$—O—)$_3$—SiMe$_2$—Q, in which Me and Ph denote methyl and phenyl groups, respectively, and Q is a 2-(methyl methoxy isopropenyloxy silyl) ethyl group of the formula —CH$_2$C-
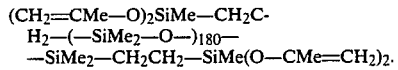
—SiMe(OMe)(O—CMe=CH$_2$).

Preparation 3.

Into a flask were introduced 150 g of a polyoxypropylene having a viscosity of 2200 centistokes and an average molecular weight of 6000, of which each molecular chain end was blocked with an allyloxy group, 13 g of methyl diisopropenyloxy silane, 0.3 g of the same isopropyl alcohol solution of chloroplatinic acid as used in Preparation 1 and 100 g of toluene to form a reaction mixture which was heated under agitation first at 40° C. for 3 hours and then at 60° C. for 8 hours to effect the reaction. The resultant liquid product, which is referred to as the polymer C hereinbelow, had a viscosity of 4000 centistokes and could be expressed by the following formula, in which Me denotes a methyl group:

(CH$_2$=CMe—O)$_2$SiMe—C$_3$H$_6$O—(—C$_3$H$_6$O—)$_6$.
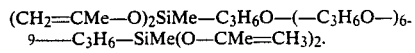
C$_3$H$_6$—SiMe(O—CMe=CH$_3$)$_2$.

Preparation 4.

A reaction mixture was prepared in a flask by mixing 210 g of an α,ω-diallyloxy-terminated polyolefin of the formula CH$_2$=CHCH$_2$—O—(—CH$_2$—)$_1$.
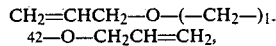—O—CH$_2$CH=CH$_2$, 200 g of toluene, 32 g of methyl diisopropenyloxy silane and 0.1 g of the same ispropyl alcohol solution of chloroplatinic acid as used in Preparation 1 and the mixture was heated to effect the reaction. After completion of the reaction, the solvent was removed by stripping under reduced pressure to leave a light yellow, clear liquid product having a viscosity of 27,000 centistokes, which is referred to as the polymer D hereinbelow. The polymer D could be expressed by the following formula:

(CH=CMe—O)$_2$SiMe—C$_3$H$_6$—O—(—CH$_2$—)$_1$.
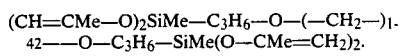—O—C$_3$H$_6$—SiMe(O—CMe=CH$_2$)$_2$.

EXAMPLE 1

A base compound was preapred by uniformly blending 100 parts of the polymer A prepared in Preparation 1 and 15 parts of a fumed silica filler after surface treatment with a silane compound.

A 100 parts portion of the thus prepared base compound was taken and admixed with 12.5 parts of a trimethylsilyl-terminated poly(methylhydrogen siloxane-dimethyl siloxane) expressed by the average formula Me$_3$Si—O—(—SiHMe—O—)$_{14}$—(—SiMe$_2$—O—)-
$_6$—SiMe$_3$ and 0.5 part of 1,1-dimethyl propargyl alcohol of the formula CH≡C—CMe$_2$—OH and, after thorough uniformization of the mixture, further with the same isopropyl alcohol solution of chloroplatinic acid as used in Preparation 1 in an amount of 100 ppm by weight as platinum based on the polymer A.

The thus prepared composition was shaped into a sheet of 2 mm thickness which was heated at 120° C. for 60 minutes to effect curing. The sheet was converted into a rubbery elastomer having a hardness of 56 in the JIS scale, tensile strength of 5.2 kg/cm$^2$ and ultimate elongation of 120%.

EXAMPLE 2

A base compound was prepared by uniformly blending 100 parts of the polymer B prepared in Preparation 2 described above and 40 parts of a wet-process silica filler. A 100 parts portion of the base compound was taken and admixed with 11 parts of the same trimethylsilyl-terminated poly(methylhydrogen siloxane-dimethyl siloxane) as used in Example 1 and, after uniformization of the mixture, further with the same isopropyl alcohol solution of chloroplatinic acid as used in Preparation 1 in amount of 10 ppm by weight as platinum based on the polymer B.

The thus prepared composition was shaped into a sheet of 2 mm thickness which was heated at 150° C. for 30 minutes to effect curing. The sheet was converted into a rubbery elastomer having a hardness of 21 in the JIS scale, tensile strength of 4.5 kg/cm$^2$ and ultimate elongation of 70%.

EXAMPLE 3

A base compound was prepared by uniformly blending 100 parts of the polymer C prepared in Prepartion 3 described above and 30 parts of a wet-process silica filler. A 100 parts portion of the base compound was taken and admixed with 5.0 parts of 1,3,5,7,9-pentamethyl cyclopentasiloxane and further with the same isopropyl alcohol solution of chloroplatinic acid as used in Preparation 1 in an amount of 20 ppm by weight as platinum based on the polymer C.

The thus prepared compositoi was shaped into a sheet of 2 mm thickness which was heated at 90° C. for 2 hours to effect curing. The sheet was converted into a rubbery elastomer having a hardness of 45 in the JIS scale, tensile strength of 30 kg/cm$^2$ and ultimate elongation of 280%.

EXAMPLE 4

A curable composition was prepared by uniformly blending 100 parts of the polymer D prepared in Preparation 4 described above with 6.0 parts of 1,3,5,7,9-pentamethyl cyclopentasiloxane and further with the same ispropyl alcohol solution of choroplatinic acid as used in Preparation 1 in an amount of 50 ppm by weight as platinum based on the polymer D.

The thus prepared composition was shaped into a sheet of 2 mm thickness which was heated at 120° C. for 1 hour to effect curing. The sheet was converted into a rubbery elastomer having a hardness of 21 in the JIS scale, tensile strength of 3.0 kg/cm$^2$ and ultimate elongation of 90%.

What is claimed is:

1. A curable polymeric composition which comprises: (A) an organic polymer having at least two alkenyloxysilyl groups; (B) an organosilicon compound having at least two hydrosilyl groups; and (C) a catalytic amount of a platinum compound, wherein (B) is present in a curable amount of up to 5 times by weight of component (A).

2. The curable polymeric composition as claimed in claim 1 wherein the amount of component (C) is from 0.1 to 1000 ppm by weight based on the amount of the component (A).

3. The curable polymeric composition as claimed in claim 1 wherein the alkenyloxysilyl group of component (A) is represented by the general formula

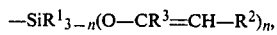
$$-SiR^1{}_{3-n}(O-CR^3=CH-R^2)_n,$$

in which $R^1$ is a monovalent hydrocarbon group, $R^2$ and $R^3$ are each a hydrogen atom or a monovalent hydrocarbon group and n is a positive integer of 1, 2 or 3.

4. The curable polymeric composition as claimed in claim 1 wherein the organic polymer is a poly(diorganosiloxane).

5. The curable polymeric composition as claimed in claim 1 wherein the organic polymer is a polyether.

6. The curable polymeric composition as claimed in claim 1 wherein component (B) is selected from the group consisting of: 1,1,3,3-tetramethyl disiloxane; trimethylsilyl-terminated methyl hydrogen polysiloxane of the formula

$$Me_3Si-O-(-SiHMe-O-)_{30}-SiMe_3;$$

trimethylsilyl-terminated poly(methylhydrogen siloxane-dimethyl siloxane) of the formula

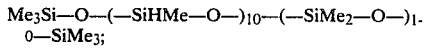
$$Me_3Si-O-(-SiHMe-O-)_{10}-(-SiMe_2-O-)_{10}-SiMe_3;$$

1,3,5,7-tetramethyl cyclotetrasiloxane; and 1,3,5,7-tetramethyl 1,3,-dipropyl cyclotetrasiloxane, in which Me is a methyl group.

7. The curable polymeric composition as claimed in claim 1 wherein the amount of component (B) is from 1.0 to 100 parts by weight per 100 parts by weight of component (A).

8. The curable polymeric composition as claimed in claim 1 wherein component (C) is selected from the group consisting of chloroplatinic acid, alcoholic solutions of chloroplatinic acid and complexes of chloroplatinic acid with an olefin or vinyl siloxane.

9. A cured rubbery elastomer obtained by heating a curable polymeric composition according to claim 1.

* * * * *